United States Patent [19]

Clark, Jr. et al.

[11] Patent Number: 4,756,520
[45] Date of Patent: Jul. 12, 1988

[54] MECHANISM FOR WEIGHTING AND APPLYING POSTAGE TO MAIL

[75] Inventors: Jack G. Clark, Jr., Grand Prairie; Steven C. Derby, Duncanville, both of Tex.

[73] Assignee: Bell Howell Company, Del.

[21] Appl. No.: 844,004

[22] Filed: Mar. 25, 1986

[51] Int. Cl.⁴ .................................. B65H 29/00
[52] U.S. Cl. .................... 271/186; 198/408; 414/765
[58] Field of Search ............. 271/186, 225, 291, 184, 271/185, 187, 315; 177/4; 198/408, 403; 414/55, 764, 765, 767; 209/540, 545, 542

[56] References Cited

U.S. PATENT DOCUMENTS

| | | |
|---|---|---|
| 2,325,455 | 7/1943 | Williams . |
| 3,368,321 | 2/1968 | Sather et al. . |
| 3,622,151 | 11/1971 | Range ................................. 271/186 |
| 3,838,771 | 10/1974 | Whiteford ...................... 271/186 X |
| 3,917,256 | 11/1975 | Kubasta . |
| 4,527,378 | 7/1985 | Russell . |
| 4,542,818 | 9/1985 | Pavie ............................... 271/186 X |

Primary Examiner—Richard A. Schacher
Attorney, Agent, or Firm—Litman, McMahon & Brown

[57] ABSTRACT

A transfer mechanism cooperates with an envelope insertion machine and a postage metering machine to transfer an envelope between the insertion and postage metering machines while rotating the envelope 180° and weighing the envelope such that the metering machine applies proper postage thereto. A drive mechanism allows independent control of rollers for transferring an envelope into a transfer cage of the transfer mechanism, rotation of the cage and subsequent reverse rotation of the rollers to discharge the envelope. Braking and locking devices are provided with the drive mechanism to ensure proper position of the cage. The cage is constructed to receive an envelope in either of opposite ends.

15 Claims, 4 Drawing Sheets

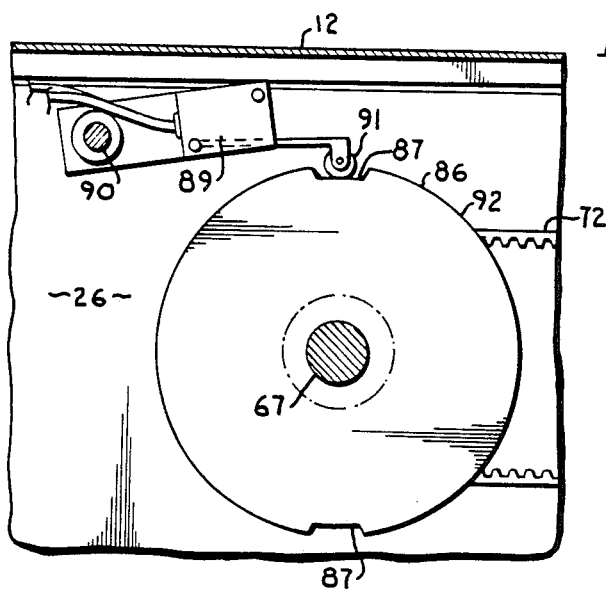
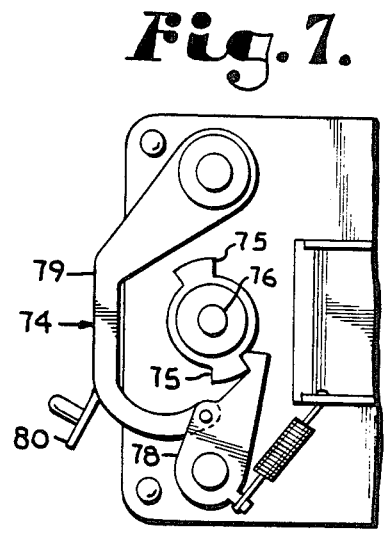
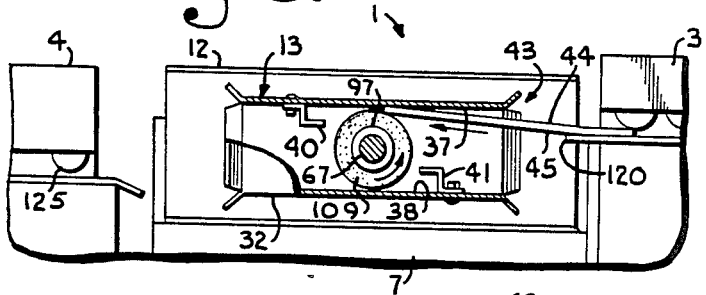
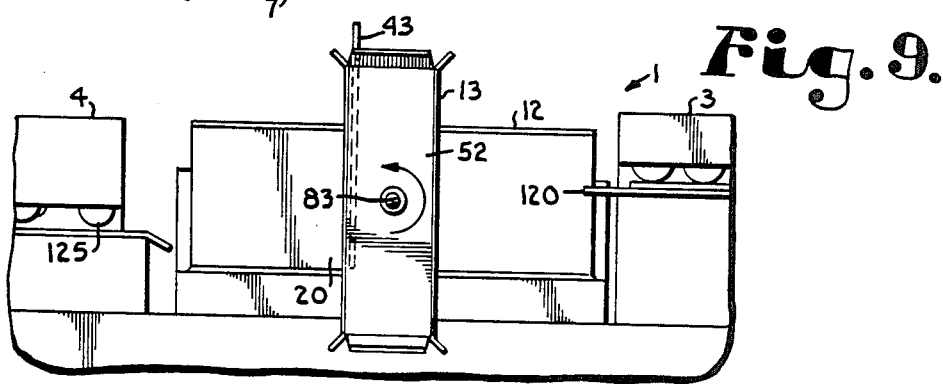
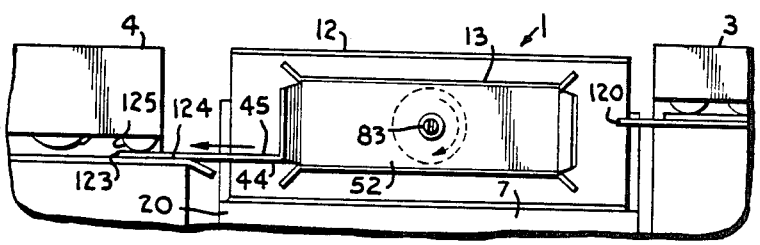

MECHANISM FOR WEIGHTING AND APPLYING POSTAGE TO MAIL

BACKGROUND OF THE INVENTION

The present invention relates to an apparatus for automatically weighing and applying postage to envelopes and, in particular, to an apparatus cooperating with an envelope insertion machine stuffing envelopes with inserts which vary in weight and consequently require varying postage.

Envelope insertion machines have existed for many years in various forms. The purpose of envelope insertion machines is to allow a user to quickly and efficiently place advertising, bank statements, etc. in an envelope for mailing. In some situations, the particular items to be mailed vary in content and weight, as in bank statements, and in other situations, each envelope receives an identical insert. Mail insertion machines vary in cost from fairly inexpensive machines which are manually inserted by an operator stationed in front of the machine to highly sophisticated machines which handle the insertion mechanically as well as weigh, stamp and sort the various resulting pieces of mail. Examples of early machines of this type can be seen in the Williams U.S. Pat. No. 2,325,455 and the Sather et al. U.S. Pat. No. 3,368,321.

The present invention is directed to an apparatus or mechanism which is especially suited for cooperating with a manual insertion machine which requires an operator to manually place the insert within the envelope. An example of such a machine can be seen in the Russell U.S. Pat. No. 4,527,378. Manual insertion machines are normally a less expensive line of insertion devices and mail metering (that is, automatically weighing and applying postage to the envelopes after insertion) is usually either not available or an optional accessory. Such machines are normally utilized in conjunction with a conventional postage application machine (often manually fed) such as is sold by Pitney Bowes and other manufacturers to apply the correct postage after a determination has been made of the weight of the stuffed envelope.

Therefore, as the manual insertion machine is usually a separate mechanism from the postage application machine or, at least requires some transfer between the location where the insertion takes place and the location where the postage is applied, a mechanism was desired that would coordinate the transfer between the insertion stage and the postage application such that the application of postage could be accomplished without extensive manual labor.

A further problem associated with applying postage to manually inserted envelopes is that for many insertion machines the front of the envelope must face down so that the flap of the envelope can pass between some device to hold the flap down and out of the way of the operator while insertion is being made. However, most postage metering machines, except for large sophisticated machines which have built-in mail metering, require that the front of the envelope face upward when the postage is being applied to the letter. Consequently, the letter must be rotated about a horizontal axis approximately 180° after the insertion process so that the letter will then be in the right position for the application of postage. It is also important that the envelope rotation be carefully controlled, so that the envelopes will be properly positioned to be received by the mail metering machine after rotation.

OBJECTS OF THE INVENTION

Therefore, the objects of the present invention are: to provide a mechanism which will bridge between a manual envelope insertion machine or the like and a postage metering machine so that an envelope can be automatically transferred from the insertion machine to the postage metering machine and appropriate postage can be applied to the envelope; to provide such a mechanism which will rotate an envelope approximately 180° about a horizontal axis thereof so as to properly align the envelope with the postage metering machine which applies postage to the front of the envelope; to provide such a mechanism which will precisely position an envelope relative to the postage metering machine after rotation; to provide such a mechanism which will weigh envelopes and transmit a signal to the postage metering machine indicative of the postage to apply to a specific envelope; and to provide such a mechanism which is easy to manufacture, easy to use and maintain and is particularly well adapted for the intended use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 6 is an enlarged and fragmentary cross-sectional view of a portion of the transfer mechanism shown in FIG. 5.

FIG. 7 is an enlarged side elevational view of a motor control mechanism and brake for the transfer mechanism.

FIG. 8 is a fragmentary and enlarged side elevational view of the postage application machine, insertion machine and transfer mechanism, shown with the transfer mechanism in an envelope receiving position and with portions broken away to show detail thereof.

FIG. 9 is a fragmentary and enlarged side elevational view of the postage application machine, insertion machine and transfer mechanism, shown with the transfer mechanism in an envelope transferring mode.

FIG. 10 is a fragmentary and enlarged side elevational view of the postage application machine, insertion machine and transfer mechanism, shown with the transfer mechanism in an envelope discharging position.

DETAILED DESCRIPTION OF THE INVENTION

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
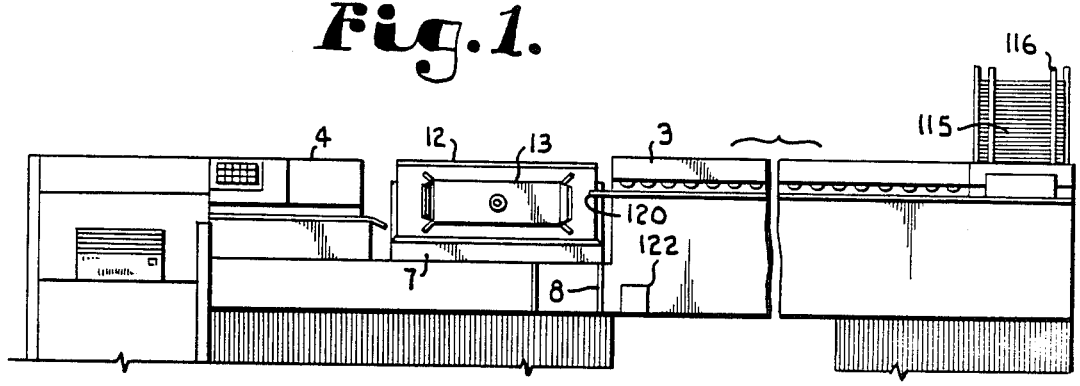
FIG. 1 is a side elevational view of an envelope insertion machine, a postage application machine, and a transfer mechanism in accordance with the present invention.
Figure 2:
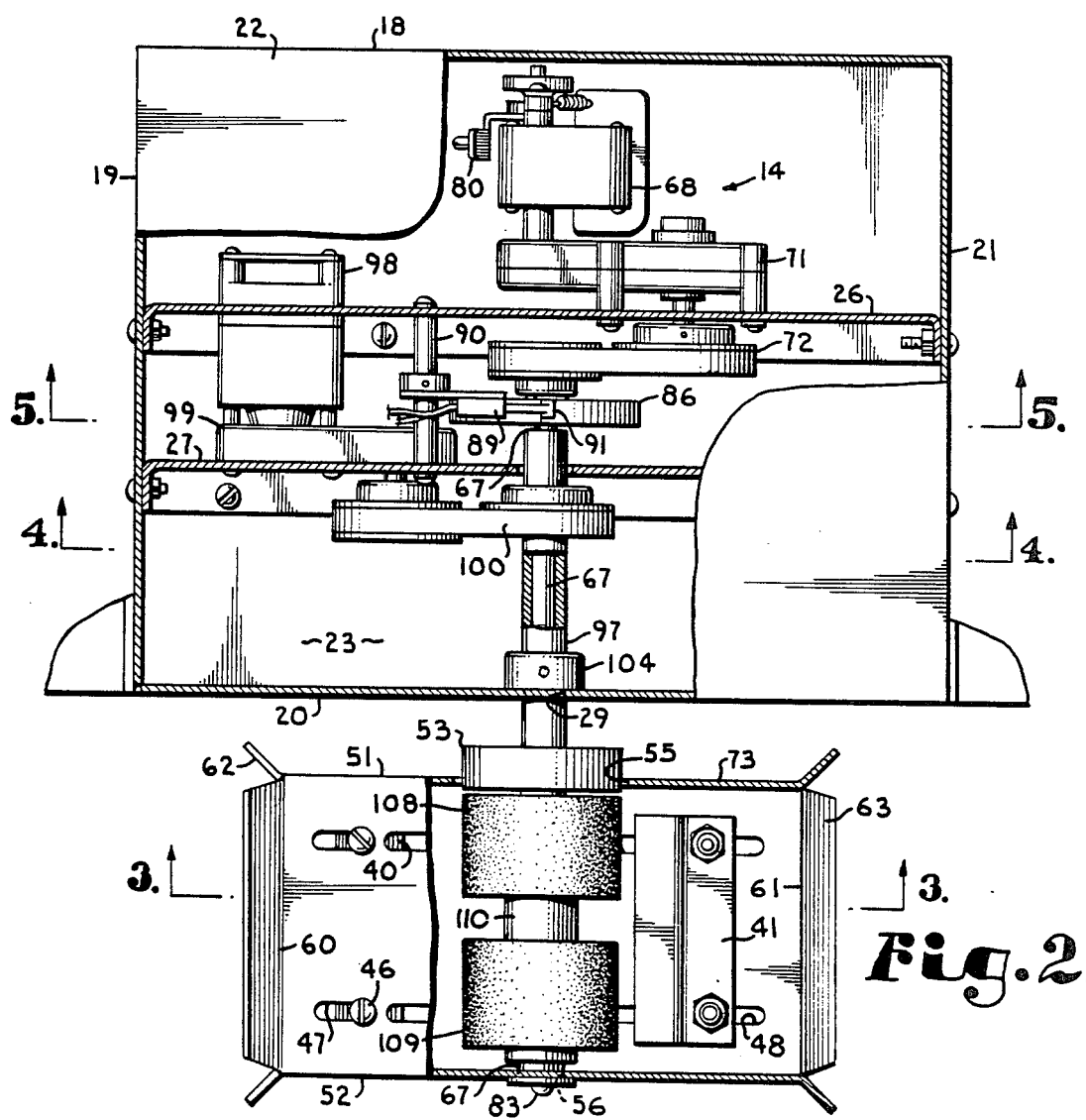
FIG. 2 is an enlarged top plan view of the transfer machine with portions thereof broken away to show detail of the drive mechanism and transfer cage thereof.
Figure 3:
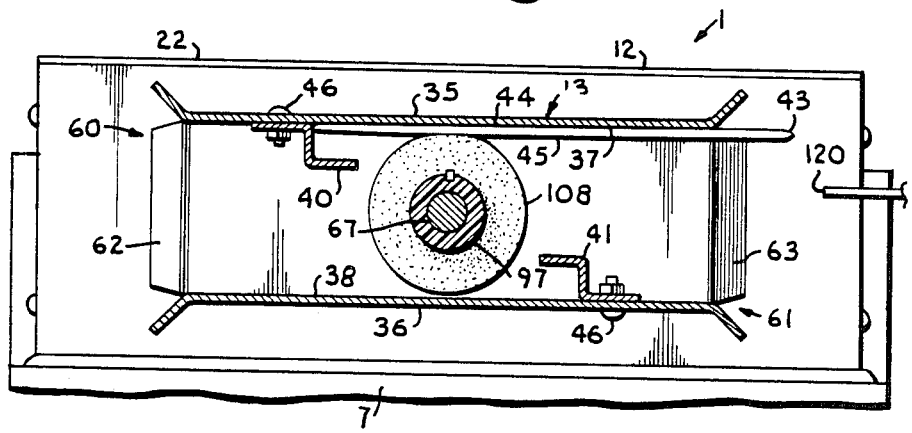
FIG. 3 is an enlarged cross-sectional view of the transfer mechanism taken along line 3—3 of FIG. 2.
Figure 4:
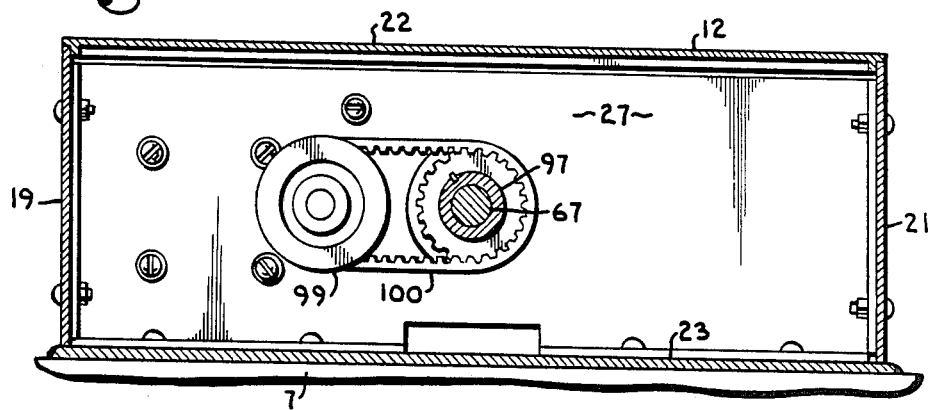
FIG. 4 is an enlarged cross-sectional view of the transfer mechanism taken along line 4—4 of FIG. 2.
Figure 5:
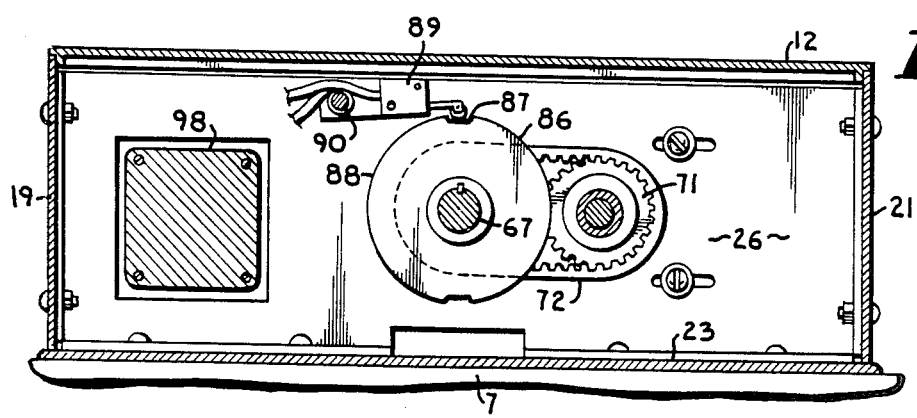
FIG. 5 is an enlarged cross-sectional view of the transfer mechanism taken along line 5—5 of FIG. 2.

Shown in FIGS. 1 through 10 is a first embodiment of a transfer mechanism 1. In FIG. 1, the transfer mechanism 1 is shown in conjunction with a manual envelope insertion machine 3 (although it is foreseen the invention will function with various envelope processing apparati wherein an envelope is discharged to a postage metering device) and a postage metering machine 4. In particular, the transfer mechanism 1 is positioned between the insertion machine 3 and the postage metering machine 4 and includes a scale 7. The insertion machine 3 has an end nearest the insertion machine positioned over a catch chute 8 to collect misdirected items discharged from the insertion machine 3.

The transfer mechanism 1 comprises a support structure 12, a transfer shuttle, carriage, or cage 13 rotatably connected to the support structure 12 and a drive mechanism 14 cooperating with the transfer cage 13.

The support structure 12 includes a rectangularly-shaped box 17 having vertically aligned and end-to-end attached sides 18, 19, 20 and 21, a horizontal top 22 and a horizontal bottom 23. A pair of vertically aligned cross-supports 26 and 27 extend from near the top 22 to near the bottom 23 and are fixedly attached at opposite ends thereof to both of the sides 19 and 21. An aperture 29 is provided in side 20 through which the drive mechanism 14 passes.

The transfer cage 13 includes an open-ended generally rectangularly or tube shaped structure 32 having generally parallel, flat and opposed envelope receiving sides 35 and 36 with opposed internal envelope receiving surfaces 37 and 38. Attached and extending outwardly from each of the opposed surfaces 37 and 38 are stops 40 and 41 resectively. The stops 40 and 41 are L-shaped with the upper end positioned to extend toward an envelope receiving end of the cage 13 and function to prevent an envelope 43 from passing entirely through the cage 13 and to properly position the envelope 43 within the cage 13. the envelope has a first (back) side 44 and a second (front) side 45.

The stops 40 and 41 are secured by screws 46 or the like in elongate adjusting apertures 47 and 48 respectively which allow for adjustment for the stops 40 and 41 to envelopes 43 of varying size.

The cage 13 also includes sides 51 and 52 which are generally parallel and opposed and which function to operably space the envelope receiving sides 35 and 36. The sides 51 and 52 each have a centrally located aperture 55 and 56 respectively which receive the drive mechanism 14 and will be discussed further hereinafter. The side 51 includes a bearing like structure 53 through which part of the drive mechanism 14 extends and which allows rotation of the external surface of the drive mechanism 14 relative to the side 51. The cage 13 includes opposite open letter receiving ends or ports 60 and 61 for receiving envelopes into the cage 13. Near each of the ports 60 and 61 is a cowling 62 and 63 respectively which flairs outward from the ports 60 and 61 so as to guide envelopes into the interior of the cage 13. It is foreseen that other structures could be substituted for the transfer cage 13 within the scope of the invention, especially where such structure provides the necessary functions of being able to receive, transfer and thereafter discharge an envelope.

The drive mechanism 14 includes an elongate shaft 67 which is operably driven by a brake motor 68 through a conventional drive train 71 and drive belt 72. As can best be seen in FIG. 7, the motor 68 includes a brake means or brake mechanism 74. The brake mechanism 74 has lugs 75 extending from the motor shaft 76 which are engageable with a locking keeper 78 which is normally biased against one of the lugs 75 to prevent the motor shaft 76 from rotating. A release mechanism 79 is provided which operably releases the keeper 78 when the release mechanism is triggered (here by being depressed). A metallic bar 80 is attached to the relase mechanism 78 and is attracted toward the brake motor 68 by the magnetic attraction produced when the motor 68 is energized, thereby depressing the relase mechanism 79 and driving the keeper 78 from engagement with the lugs 75 so as to allow the motor shaft 76 to rotate. The keeper 78 then is biased back toward the shaft 76 soas to engage the next successive lug 75 after the motor 68 has rotated the cage 13 180° thereby stopping or braking rotation of the cage 13 and backing the cage 13 in position for a subsequent letter receiving and discharging cycle.

The shaft 67 is mounted so as to be rotatable within and supported by the cross-support 27 and the side 20. The shaft 67 is secured to the cage 13, so that the cage 13 is positively driven by the shaft 67, by a bolt 83 which passes through aperture 56 in side 52 such that the cage 13 rotates about a horizontal axis thereof with the shaft 67.

A cam 86 is secured to and rotates with the shaft 67. The cam includes a pair of depressions 87 in an outer cylindrical surface 88 and circumferentially spaced by 180°. A switch 89 is secured by a member 90 to cross-supports 26 and 27. The switch 89 includes a cam riding wheel 91 which rides along an outer track 92 of the cam 86 so as to biased into one of the depressions 87 when positioned thereover. The wheel 91 falling into one of the depressions 87 triggers the switch 89 as will be discussed later.

Rotatably positioned on the shaft 67 is an annular sleeve 97 which is driven by a reversible motor 98 through a conventional drive train 99 and drive belt 100. The sleeve 97 is free to rotate independent of the shaft 67. A positioning ring 104 is secured to the sleeve 97 and holds the sleeve 97 in position relative to the side 20.

The sleeve 97 passes through the cage side 51 so as to be rotatable in the bearing 53 relative to the side 51 and to be able to rotate independently thereof. Attached to the sleeve 97 within the cage 13 are a pair of resilient envelope drive rollers 108 and 109 which are separated by a spacer 110. Suitable rollers 108 and 109 may be made of foam or neoprene rubber and should grip and drive an envelope 43 into the cage 13 against one of the cage inner surfaces 37 or 38. The rollers 108 and 109 rotate with and are drive by the sleeve 97 and, thereby, are operably driven by the motor 98 either clockwise or counterclockwise depending on the direction command signal given to the motor 98, as will be discussed below.

Attention is directed to FIGS. 1, 8, 9 and 10. With specific reference to FIG. 1, an envelope 43 is drawn from an envelope supply in an envelope storage hopper 116 by automatic operation of the insertion machine 3 and conveyed along a conveyor 117 to an operator at a work station (not shown) to allow placement of an insertion therein. The envelope 43 (see FIG. 8) faces downwardly (that is the envelope 43 has its address and postage carrying side 45 facing downward) as it travels along the conveyor 117 such that the addressee's name faces down and the location where postage will be applied is also downwardly facing. After insertion or stuffing of an insert into the envelope 43 by an operator, a flap of the envelope (not shown) is closed and sealed by a mechanism (not shown). The envelope 43 is thereafter rejected from the insertion machine 3 at a discharge end 120 of the conveyor 117.

With reference to FIG. 8, the cage 13 is at this time positioned such that one of the open ports or ends 60 or 61 faces the conveyor end 120, so that that an envelope 43 being discharged from the conveyor end 120 is extended into the interior of the cage 13 along a first path of movement.

Simultaneously, the rollers 108 and 109 are driven in a counterclockwise direction, as seen in FIG. 8, so as to drive the envelope along the surface 37 and into the stop 40. The envelope 43 then comes to rest within the cage 13 against the stop 40 and is held against the surface 37 by the rollers 108 and 109. Although in the illustrated embodiment, the envelope 43 enters near the top of the cage 13 and slides along the cage top surface 37, it is foreseen that stops such as stops 40 and 41 could be placed on opposite surfaces (38 and 37 respectively) but as mirror images of stops 40 and 41 and the envelope 43 then positioned to enter the cage 13 near the bottom surface (here 38) thereof. However, it has been found that placement of the envelope 43 along the cage top surface 37 faclitates passage of the envelope 43 into the postage metering machine 4, as will be discussed below.

A computerized controller 122 of a type conventionally used to control operation of machinery is associated with the transfer mechanism 1 and in the illustrated embodiment is included in the control system for the insertion machine 3, however, such a controller 122 may be independently included in the insertion machine 3. The controller 122 is connected to the scale 7, the motor 68, the motor 98, and the switch 89, as well as to the insertion machine 3 and postage metering machine 4 by conventional wiring or the like (not shown).

In use the scale 7 is tared to indicate zero weight when nothing is within the cage 13 or otherwise perturbating the scale 7. As soon as an envelope 43 enters the cage 13, the scale 7 automatically senses a weight within the cage 13 and triggers the controller 122 to indicate that an envelope 43 is entering into position to be weighed. After a short time delay in which the envelope 43 is allowed to completely enter the cage 13 and the scale 7 is allowed to reach an equilibrium position, the controller 122 signals the scale 7 to lock in a weight for a particular envelope, for example, five ounces. The envelope 43 is weighed to the nearest next ounce or half ounce as the case may be, for determining postage.

Preferably, at this time a signal is also transmitted from the insertion machine 3 which indicates that it is prepared to go through its next cycle of inserting and preparing an envelope for the transfer mechanism 1. At this time, the controller 122 is signaled to transmit a weight or alternatively a postage setting to the postage metering machine 4 for the particular envelope 43 within the cage 13. Another short delay allows the postage metering machine 4 to lock in the postage for the next envelope 43 to be metered.

The motor 68 is thereafter energized such that its magnetic field depresses the release mechanism 79 and allows the shaft 67 to rotate as it is driven by the motor 68. The shaft 67 rotates approximately 180° at which time the wheel 91 of the switch 89 engages the next sequential depression 87 on the cam 86. At this time, a signal is sent to the motor 68 to deenergize which thereafter stops the motor 68 and allows the keeper 78 to move toward the motor shaft 76 and reengage one of the lugs 75 to stop rotation of the shaft 67 with the consequence that the cage 13 is rotated 180° about a horizontal axis and, in particular, about the shaft 67. This rotation is seen in FIG. 9. It is desired that the motor 68 rotate the cage as precisely as possible 180°, then brake and lock in proper position for the cage 13 to be best aligned to receive a subsequent envelope 43.

After rotating 180°, the cage 13 is positioned such that the envelope 43 therein is located near the bottom side thereof, see FIG. 10. A forward edge 123 of the envelope 43 rests on the receiving surface 124 of the postage mailing machine 4. The motor 98 is thereafter reversed by the controller 122 such that the rollers 108 and 109 are driven in a clockwise fashion, as seen in FIG. 10, and thereby drive the envelope 43 outwardly along a second path of movement from the cage 13 and into engagement with the pickup rollers and triggering switch 125 of the postage metering machine 4.

The postage metering machine 4 is preferably of the type which automatically draws the envelope 43 into the machine to have postage applied as soon as it senses an envelope 43 is in position to be metered, here when it hits the triggering switch 125. A suitable mail metering machine 4 for this purpose has been found to be the Hassler 305 or 307. Although a number of similar and equally suitable machines are made by other various companies, such as Pitney Bowes.

It is noted that when one side of the cage 13 is discharging an envelope 43 to the metering machine 4, the opposite side is aligned to receive an envleope 43 from the insertion machine 3 so a second rotation of the cage 13 is unnecessary to prepare the cage 13 for a subsequent cycle.

The scale 7 is herein shown as a separate mechanism from the support structure 12. However, it is foreseen that the scale mechanism 7 can be incorporated directly into the support structure 12 within the scope of the invention. A suitable scale mechanism has been found to be the IMS 2500 although numerous other scales which can determine a weight and transfer a signal of such weight would be quite suitable for this purpose. It is foreseen that, for some operations, it may be preferable to have a scale which triggers an alarm for an operator if the scale senses that the weight is inappropriate or if the scale senses that it has not been able to reach an equilibrium position within the time frame necessary to determine the correct postage for a given envelope. For example, an alarm may be given, if it were determined by the scale that the weight was abnormally large or if someone accidentally knocked the machine and caused a vibration to continue past the normal time for equilibrium.

Figure 11:
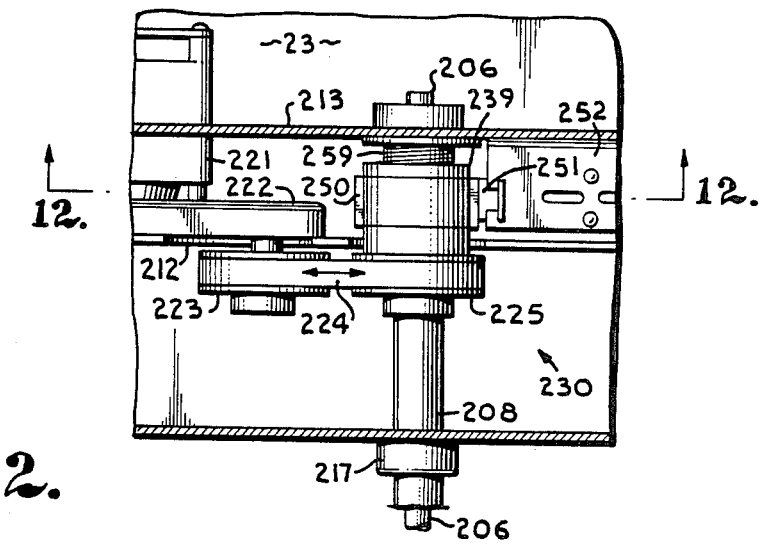
FIG. 11 is a fragmentary top plan view of a drive mechanism for a modified embodiment of a transfer mechanism, according to the present invention with portions broken away to show interior detail thereof.
Figure 12:
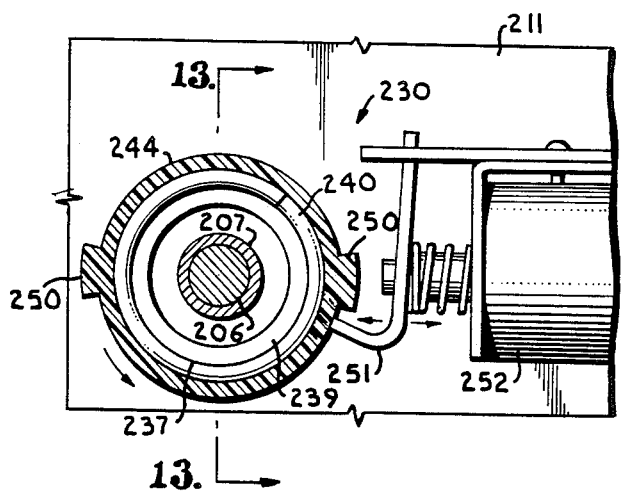
FIG. 12 is an enlarged and fragmentary cross-sectional view of the drive mechanism, taken along line 12—12 of FIG. 11.
Figure 13:
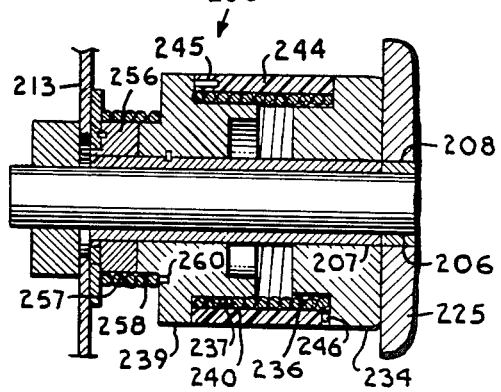
FIG. 13 is an enlarged and fragmentary cross-sectional view of the drive mechanism, taken along line 13—13 of FIG. 12.

Shown in FIGS. 11 through 13 is a modified inserting mechanism 201. Except as described as follows, the inserting mechanism 201 is substantially identical to insertion mechanism 1 of the previous embodiment and, therefore, use of the other structure shown in the previous embodiment with the mechanism 201 is foreseen. A drive mechanism 204 of the inserting mechanism 201 is structurally different than the drive mechanism 14 of the previous embodiment and, therefore, this drive mechanism 204 will be described in detail, whereas the remaining detail of inserting mechanism 201 will only be described as it differs from insertion mechanism 1.

The drive mechanism 204 includes a first drive shaft 206 which is connected at one end (not shown) to a transfer cage (not shown) which is essentially identical to the transfer cage 13 of the previous embodiment. A first sleeve 107 is positioned around the rear of the shaft 206 and fixedly attached thereto such that both rotate together. Also sleeved about the drive shaft 206 forward of the sleeve 207 is a second drive shaft 208 which has sufficient clearance tolerances relative to the drive shaft 206 so as to be able to rotate independently thereof.

The drive shafts 206 and 208 are supported by a support structure 210 and, in particular, by outer wall 211 and cross-walls 212 and 213 of the support structure 210. The drive shaft 208 is mounted on bearings or the like in suitable apertures in walls 211, 212 and 213 so as to be rotatable with respect thereto. A keeper ring 217 which is fastened securely to the drive shaft 207 maintains the position of the drive shaft 207 relative to the support structure 210 and, in particular, to the wall 211.

The drive shafts 206 and 208 are both driven by a single reversible motor 221 through means of a drive train 222 which transfers power to a suitable drive pulley 223 and thereafter to a drive belt 224 and subsequently to another suitable drive pulley 225 which is secured to the outer drive shaft 208. In this manner, operation of the motor 221 in a forward or reverse direction likewise causes the driveshaft 208 to rotate in a forward or reverse mode (that is, what would be counterclockwise or clockwise in FIG. 12). The motor 221 and drive train 222 are mounted on the support structure 210.

The drive shafts 206 and 208 are operably connected by a clutch mechanism 230. The clutch mechanism 230 is a sophisticated structure which allows the outer drive shaft 208 to be rotated in either direction, that is, clockwise or counterclockwise; but allows the inner drive shaft 206 to be rotated in only a counterclockwise direction (as seen in FIG. 12) and only at selected times relative to the rotation of the outer drive shaft 208.

The clutch 230 also ensures that the inner drive shaft 206 rotates quite precisely almost 180° within a close tolerance (preferably less than 1.0 or 0.50 deviation in either direction from 180°) with each incremental rotation thereof. The clutch 230 functions as a positioner for allowing rotation of 180°, as a brake for stopping rotation at 180°, as an anti-recoil device to prevent the shaft 206 from center-rotating due to recoil once it has rotated 180° and as a locking device to hold the shaft 206 and attached cage in a selected position until it is time for a subsequent rotation of 180°. This allows quite precise placement of the cage associated with the insertion mechanism 201. The clutch 230 specifically prevents rebound or backlash of the inner drive shaft 206 upon coming to a halt. Clutches have been designed similar to the clutch 230 herein illustrated for other purposes and such clutches have been manufactured by Marquette of Cleveland, Ohio and are shown in U.S. Pat. No. 4,059,176.

The particular clutch illustrated in FIGS. 11 through 13 includes a first somewhat annularly or cylindrically shaped structure 234 which is sleeved on the shaft 207 and which is secured to the drive pulley 225 so as to rotate therewith. The structure 234 includes a annular surface 236. Also sleeved on and fixedly attached to the shaft 207 is a second somewhat annular shaped structure 239 having a generally cylindrical surface 237 similar in diameter to the surface 236. A first helical round spring 240 is wrapped about the surfaces 237 and 236 so as to transmit a certain amount of torque between the structures 234 and 239, provided that the structure 239 is not being held in place. That is, the spring 240 will rotate structure 239 if structure 234 is being rotated by its association with pulley 225 and subsequently the motor 221, however if structure 239 is being held lockably in place, as discussed below, then such a transfer will not occur, but this will not prevent the structure 234 from rotating nor the shaft 208 from rotating. A third annular structure is mounted so as to ride on top of the spring 204 loosely. The structure 234 includes a pin 245 in a channel which loosely locks the structure 244 to the structure 239 so as to rotate therewith except for 1° to 4° of rotation. The structure 244 is also attached to the spring 240 by the end of the spring 246 nearest the structure 234. The structure 244 further includes outwardly projecting lugs 250 spaced at 180° from one another. In this manner, if one of the lugs 250 is held in position, then the structure 245 prevents the spring 240 from rotating.

The lugs 250 are engaged by a keeper mechanism 251 associated with a solenoid 252. When the solenoid 252 is activated the keeper mechanism 251 is pulled away from the lug 250 and then allowed to fall back against the structure 244 so as to engage the next subsequent lug 250. In this manner, the structure 244 is allowed to rotate 180° with each activation of the solenoid 252. In this way also, the keeper mechanism 251 acts as a break to prevent further rotation of the third structure 244 and subsequently rotation of the shaft 206 as will be described herein later.

A fourth generally cylindrical structure 256 is mounted around the shaft 207 and has a diameter so as to have an outer surface 257 which is approximately the same diameter as a surface 258 on structure 239. The surfaces 257 and 258 have sleeved thereon a second spring 259 which fits snugly thereabout. The spring 259 has an end which is secured to the structure 239. The opposite end of the spring 259 is not secured to the surface 257. The structure 256 is operably attached to the support wall 213 so as not to allow rotation thereof relative to the wall 213. In this manner, when the structure 239 rotates in a counterclockwise direction, as seen in FIG. 12, then the spring 259 loosens to allow the structure 239 to rotate relative to the structure 256 and subsequently to allow the shafts 206 and 207 which are attached to the structure 239 to rotate. When the structure 239 tries to rotate in a clockwise direction, as seen in FIG. 12, the spring 259 is snugged tightly against the surface 257 such that friction locks the structure 256 relative to the structure 239 and does not allow the structure 239 and consequently the shafts 207 and 206 to rotate. This, in effect, allows the shaft 206 to rotate in a counterclockwise direction, as seen in FIG. 12, when the keeper mechanism 251 is pulled away from one of the lugs 250 and prevents the shaft 206 from rotating in a clockwise direction, as seen in FIG. 12, when the shaft 208 is rotated in such a direction or after the keeper mechanism 251 engages the next subsequent lug 250 thereby very quickly braking the rotation of the shaft 206 and preventing the shaft 206 from inadvertently rebounding or recoiling and rotating in a clockwise direction or being rotated by an outside force such as when the cage is inadvertently struck by an operator. This very effectively positions the cage attached to the shaft 206.

In use, the inserting mechanism 201 is utilized as much as the insertion mechanism 1 of the previous embodiment with the exception that an associated controller triggers the single motor 221 to run the shaft 208 forwards or in reverse and triggers the solenoid 251 to release the shaft 206 to rotate the cage associated therewith.

It is to be understood that while certain forms of the present invention have been illustrated and described herein, it is not to be limited to the specific forms or arrangement of parts described and shown.

What is claimed and desired to be secured by Letters Patent is as follows:

1. A transfer mechanism for transferring an envelope from an envelope insertion apparatus to a postage metering apparatus, the envelope having a first side and a second side; said mechanism comprising:
   (a) a support structure;
   (b) an envelope transfer cage rotatably mounted on said support structure;
      (i) said envelope transfer cage having an envelope receiving opening and being adapted for receipt of an envelope through said opening while said cage is in a first selected position and for transfer of an envelope therefrom at a second selected position;
      (ii) said support structure including transfer cage positioning means selectively operationally aligning said transfer cage between the envelope insertion apparatus and the postage metering apparatus; and,
   (c) motor means including a transfer cage drive mechanism;
      (i) said transer cage drive mechanism selectively rotating said transfer cage to orient said transfer cage to said first position to allow receipt of an envelope from the envelope insertion apparatus with said envelope horizontally aligned and such that the envelope is received through said cage opening along a path generally perpendicular to an axis of rotation of said cage; and, said transfer cage drive mechanism further selectively rotating said transfer cage to orient said transfer cage to said second position wherein the envelope has been rotated about said axis of rotation approximately 180° and is generally horizontally aligned and to thereafter transfer the received envelope through said cage opening to the postage metering apparatus;
      (ii) said transfer cage drive mechanism positioning said transfer cage for receipt of the envelope with the first envelope side facing generally upwardly; and, said transfer cage drive mechanism further, thereafter, positioning said transfer cage to transfer a received envelope therefrom, with the first envelope side facing generally downwardly;
   (d) whereby an envelope, having been transferred into said envelope transfer cage from the envelope insertion apparatus, is transferred to the postage metering apparatus and the envelope is rotated from the first envelope side facing upwardly to downwardly.

2. A transfer mechanism according to claim 1 including:
   (a) an envelope drive mechanism;
      (i) said envelope drive mechanism including means driving a selected envelope into said transfer cage; and,
      (ii) said envelope drive mechanism including means selectively driving a received envelope out of said transfer cage.

3. A transfer mechanism for transferring an envelope from an envelope insertion apparatus to a postage metering apparatus; said mechanism comprising:
   (a) a support structure;
   (b) an envelope transfer cage rotatably mounted on said support structure;
      (i) said envelope transfer cage being adapted for receipt of an envelope therein and for transfer of an envelope therefrom;
      (ii) said support structure including transfer cage positioning means allowing selective operational position of said transfer cage between the envelope insertion apparatus and the postage metering apparatus; and
      (iii) said envelope transfer cage having an open end radially spaced from a substantially horizontal axis of rotation of said cage; said cage having a planar envelope receiving surface adjacent to said cage opening; said planar surface having positioned therealong a stop spaced from said opening and projecting from said surface; said stop aligned such that an envelope received through said opening is stopped and positioned by said stop;
   (c) motor means including a transfer cage drive mechanism;
      (i) said transfer cage drive mechanism selectively rotating said transfer cage so as to orient said transfer cage in a first position for receipt of an envelope from the envelope insertion apparatus along a first path of envelope movement; and
      (ii) said transfer cage drive mechanism thereafter selectively rotating said transfer cage approximately 180° about said horizontal axis-of-rotation extending generally perpendicularly to the path of envelope movement;
   (d) whereby an envelope being transferred by said transfer mechanism is rotated approximately 180° while being transferred from the envelope insertion apparatus to the postage metering apparatus.

4. A transfer mechanism for transferring an envelope from an envelope insertion apparatus to a postage metering apparatus, the envelope having a first side and a second side; said mechanism comprising:
   (a) a support structure;

(b) an envelope transfer cage rotatable mounted on said support structure;
  (i) said envelope transfer cage having an axis of rotation and being adapted for selective receipt of an envelope therein along a first path generally perpendicular to said axis of rotation and for selective transfer of an envelope therefrom along a second path generally perpendicular to said axis of rotation; said cage including an envelope receiving surface adjacent said opening; and
(c) motor means including a transfer cage drive mechanism and a cage braking mechanism;
  (i) said motor means selectively rotating said transfer cage between a first position, therein said cage surface is substantially horizontally and wherein said transfer cage is oriented for receipt of an envelope, with a first envelope side facing generally upwardly from the envelope insertion apparatus, and a second position, wherein said cage surface is also substantially horizontal and wherein said transfer cage is oriented to discharge the envelope with a second side facing generally upwardly, into the postage metering apparatus; and
  (ii) said cage braking mechanism selectively retaining said transfer cage in either of said first and second positions.

5. A transfer mechanism for transferring an envelope form an envelope insertion machine to a postage metering machine; said mechanism comprising:
(a) a support structure;
(b) a transfer cage supported by said support structure, rotatable about a horizontal axis of rotation and adapted to be positioned between an insertion machine and a postage metering machine; said cage including an envelope receiving opening;
(c) motor means cooperating with said cage for rotating said cage and for selectively and positively urging an envelope from said cage; and
(d) said cage including receiving means adapted to receive an envelope from the insertion machine through said opening along a path generally perpendicular to the axis of rotation of said cage and such that the envelope is generally horizontally aligned; thereafter said motor means selectively rotating said cage approximately 180° about said axis of rotation such that an envelope is rotated 180° and thereafter urged from said cage by said motor means such that the envelope is generally horizontally aligned and positioned to be received by the postage metering machine whereby the envelope is transferred from the insertion machine to the metering machine while being inverted.

6. A transfer mechanism for transferring an envelope from an envelope insertion appartus to a postage metering apparatus, the envelope having a first side and a second side; said mechanism comprising:
(a) a support structure;
(b) an envelope transfer cage rotatably mounted on said support structure;
  (i) said envelope transfer cage being adapted for receipt of an envelope therein at a first selected position and for transfer of an envelope therefrom at a second selected position;
  (ii) said support structure including transfer cage positioning means selectively operationally aligning said transfer cage between the envelope insertion apparatus and the postage metering appartus; and,
(c) motor means including a trasnfer cage drive mechanism;
  (i) said transfer cage drive mechanism selectively rotating said transfer cage to orient said transfer cage to said first position for receipt of an envelope from the envelope insertion apparatus; and, said transfer cage drive mechanism further selectively rotating said transfer cage to orient said transfer cage to said second position to transfer a received envelope to the postage metering apparatus;
  (ii) said transfer cage drive mechanism positioning said transfer cage for receipt of the envelope with the first envelope side facing generally upwardly; and, said transfer cage drive mechanism further, thereafter, positioning said transfer cage to transfer a received envelope therefrom, with the first envelope said facing generally downwardly;
(d) whereby an envelope, having been transferred into said envelope transfer cage from the envelope insertion apparatus, is transferred to the postage metering apparatus and the envelope is rotated from the first envelope side facing upwardly to downwardly; and further including:
(e) an envelope drive mechanism;
  (i) said envelope drive mechanism including means driving a selected envelope into said transfer cage; and,
  (ii) said envelope drive mechanism including means selectively driving a received envelope out of said transfer cage;
(f) said envelope drive mechanism including at least one compressible roller having an outer surface adapted to engage and drive an envelope and being rotatably mounted within said transfer cage; said roller also being oriented to engage an envelope being transferred into said transfer cage from the envelope insertion apparatus;
(g) said envelope drive mechanism includes a reversible roller drive mechanism adapted to selectively drive an engaged envelope into said transfer cage, by rotation in a first direction, and to selectively drive an engaged envelope out of said transfer cage, by rotation in a second direction; and
(h) said transfer cage includes a stop mounted therein adapted to receive an envelope in abutting relationship thereagainst, when an envelope is driven into said transfer cage, so as to position an envelope within said transfer cage.

7. A transfer mechanism according to claim 6 wherein:
(a) said transfer cage drive mechanism includes a first rotatable driveshaft;
  (i) said first driveshaft having a first end cooperating with said transfer cage to rotate same as said driveshaft is rotated;
(b) said envelope drive mechanism includes a second, rotatable, driveshaft;
  (i) said second driveshaft having said roller mounted thereon; said roller being rotated, to selectively drive an engaged envelope, as said second driveshaft is selectively rotated;
(c) said second driveshaft being sleeved on and rotatable relative to said first driveshaft;

(d) whereby said first driveshaft and said second driveshaft may be selectively rotated by motor means.

8. A transfer mechanism for transferring an envelope from an envelope insertion apparatus to a postage metering apparatus; said mechanism comprising:
(a) a support structure;
(b) an envelope transfer cage rotatably mounted on said support structure;
   (i) said envelope transfer cage being adapted for receipt of an envelope therein and for transfer of an envelope therefrom;
   (ii) said support structure including transfer cage positioning means allowing selective operational positioning of said transfer cage between the envelope insertion apparatus and the postage metering appartus; and
(c) motor means including a transfer cage drive mechanism;
   (i) said transfer cage drive mechanism selectively rotating said transfer cage so as to orient said transfer cage in a first position for receipt of an envelope from the envelope insertion apparatus along a first path of envelope movement; and
   (ii) said transfer cage drive mechanism thereafter selectively rotating said transfer cage approximately 180° about a substantially horizontal axis-of-rotation extending generally perpendicularly to the path of envelope movement;
(d) whereby an envelope being transferred by said transfer mechanism is rotated approximately 180° while being transferred from the envelope insertion apparatus to the postage metering apparatus; and wherein:
(e) said transfer cage comprises an elongate tube of rectangular cross section; said tube having: a first, inside, envelope-receiving surface; and an opposite second, inside, envelope-receiving surface; first and second sidewalls; a first open end and a second open end;
   (i) said transfer cage having: a first outwardly flared cowling mounted on said first open end; and, a second outwardly flared cowling mounted on second open end;
   (ii) said transfer cage adapted to receive a first envelope from the envelope insertion apparatus, against said first envelope receiving surface; and, said transfer cage further adapted to selectively receive a different envelope, from said envelope insertion apparatus, against said second envelope-receiving surface, after said transfer cage is rotated approximately 180°.

9. A transfer mechanism for transferring an envelope from an envelope insertion apparatus to a postage metering apparatus, the envelope having a first side and a second side; said mechanism comprising:
(a) a support structure;
(b) an envelope transfer cage rotatably mounted on said support structure;
   (i) said envelope transfer cage being adapted for selective receipt of an envelope therein and for selective transfer of an envelope therefrom;
(c) motor means including a transfer cage drive mechanism and a cage braking mechanism;
   (i) said motor means selective rotating said transfer cage between a first position, wherein said transfer cage is oriented for receipt of an envelope, with a first envelope side facing generally upwaprdly from the envelope insertion apparatus, and a second position, wherein said transfer cage is oriented to discharge the envelope with a second side facing generally upwardly, into the postage metering apparatus;
   (ii) said cage braking mechanism selectively retaining said transfer cage in either of said first and second positions; and
(d) an envelope drive mechanism having a compressible roller rotatably mounted within said transfer cage and oriented to engage an envelope being transferred into said transfer cage from the envelope insertion apparatus;
   (i) said envelope drive mechanism including a reversible roller drive mechanism adapted to selectively drive an engaged envelope into said transfer cage, by rotation in a first direction, and to selectively drive an engaged envelope out of said transfer cage, by rotation in a second direction; and
(e) a stop, mounted in said transfer cage, against which a received envelope abuts, when driven a predetermined length into said transfer cage.

10. A transfer mechanism for transferring an envelope from an envelope insertion apparatus to a postage metering apparatus, the envelope having a first side and a second side; said mechanism comprising:
(a) a support structure;
(b) an envelope transfer cage rotatably mounted on said support structure;
   (i) said envelope transfer cage being adapted for selective receipt of an envelope therein and for selective transfer of an envelope therefrom; and
(c) motor means including a transfer cage drive mechanism and a cage braking mechanism;
   (i) said motor means selectively rotating said transfer cage between a first position, wherein said transfer cage is oriented for receipt of an envelope, with a first envelope side facing generally upwardly from the envelope insertion appartus, and a second position, wherein said transfer cage is oriented to discharge the envelope with a second side facing generally upwardly, into the postage metering apparatus;
   (ii) said cage braking mechanism selectively retaining said transfer cage in either of said first and second positions;
(d) said transfer cage drive mechanism includes a first rotatable driveshaft;
   (i) said first driveshaft having a first end cooperating with said transfer cage to rotate same as said first driveshaft is rotated;
(e) said envelope drive mechanism includes a second rotatable driveshaft;
   (i) said second driveshaft having said roller mounted thereon; said roller being rotated, to selectively drive an engaged envelope, as said second driveshaft is selectively rotated;
(f) said second driveshaft being sleeved on said first driveshaft such that said first and second driveshafts are substantially coaxial;
(g) motor means associated with said first and second driveshaft;
(h) whereby said first driveshaft and said second driveshaft may be selectively rotated by said motor means.

11. A transfer mechanism according to claim 10 wherein:

(a) said transfer drive mechanism includes a clutch which is operable to selectively slave rotation of said first drive shaft to said second driveshaft;

(b) a reversible motor to drive said second driveshaft; and (c) control means to selectively operate said clutch, said motor and said braking mechanism to allow said first driveshaft to be rotated in a forward rotation to provide for receipt of an envelope into said cage and to allow the envelope to be driven into the cage by said roller, to thereafter selectively slave said first driveshaft to said second driveshaft to allow said cage to rotate while said roller rotates; to activate said braking mechanism to brake rotation of said first driveshaft after a cage rotation of 180° to allow discharge of an envelope, and to thereafter rotate said first driveshaft in a reverse rotation to discharge the envelope.

12. The transfer mechanism according to claim 11 wherein:

(a) said clutch includes a first surface connected to said first driveshaft and a second surface connected to said second driveshaft and a first torque transferring spring mounted on and extending between said first and second surfaces;

(b) a sleeve mounted over said first spring and attached to one end of said spring;

(c) said sleeve having a projecting lug thereon;

(d) a braking solenoid having a lug engaging release mechanism associated therewith; said release selectively releasing and subsequently engaging said lug;

(e) whereby when said second driveshaft rotates in a forward rotation said first driveshaft is frictionally slaved to said second driveshaft by said first spring provided that said braking solenoid is activated and said release mechanism does not engage said lug thereby allowing said first driveshaft to rotate; however when said release mechanism engages said lug, said first drive shaft brakes and said first spring rotates about said first driveshaft with said second driveshaft.

13. The transfer mechanism according to claim 12 including:

(a) a second spring wrapped about a third surface connected to rotate with said first driveshaft and about a fourth surface held in fixed position; said second spring being attached to said third surface so as to rotate therewith;

(b) said spring snugging against said fourth surface to operably prevent said first driveshaft from rotating in a reverse direction but loosening to allow said first driveshaft to rotate in a forward direction such that on braking said first driveshaft does not rotate in reverse or recoil but rather stops within plus or minus 1° of a targeted position.

14. A transfer mechanism for transferring an envelope from an envelope insertion machine to a postage metering machine; said mechanism comprising:

(a) a support structure;

(b) transfer means rotatably supported by said support structure and adapted to be positioned between an insertion machine and a postage metering machine;

(c) motor means cooperating with said transfer means, such that said transfer means: selectively transfers an envelope from the insertion machine to the postage metering machine, rotates said transfer means, and selectively drives each envelope from the transfer mechanism;

(d) said transfer means having first and second envelope receives on opposite sides thereof; said receivers having envelope receiving openings facing in opposite directions so as to receive an envelope along a path generally perpendicular to an axis of rotation of a respective receiver; and (e) said transfer means adapted to receive a first generally horizontally aligned envelope from the insertion machine into one of said receivers and thereafter said motor means rotates said receivers approximately 180° about said axis of rotation such that such first envelope is rotated 180° to be generally horizontally aligned and thereafter be positioned to discharge said first envelope into the postage metering machine and such that said second receiver is simultaneously positioned to receive a second envelope.

15. A transfer mechanism for transferring an envelope from an envelope insertion machine to a postage metering machine; said mechanism comprising:

(a) a support structure;

(b) a transfer cage: being supported by said support structure, rotatable about a generally horizontal axis, and adapted to be positioned between an insertion machine and a postage metering machine; said cage having an envelope receiving opening spaced from said axis of rotation and an envelope receiving surface adjacent said opening; said surface having a stop positioned therealong and spaced from said opening so as to position a letter therein;

(c) drive means comprising a rotating roller closely spaced relative to said surface;

(d) motor means cooperating with said cage for rotating said cage and selectively rotating said roller for urging an envelope from said cage; and (e) said roller and said stop cooperating to hold an envelope against said surface during rotation of said cage.

* * * * *